(12) United States Patent
Schierschmidt et al.

(10) Patent No.: US 11,991,959 B2
(45) Date of Patent: May 28, 2024

(54) WORK IMPLEMENT, WORK VEHICLE AND METHOD

(71) Applicant: Komatsu America Corp., Chicago, IL (US)

(72) Inventors: William Schierschmidt, Chattanooga, TN (US); Miteshkumar Patel, Hixson, TN (US); Andre Lacoursiere, Trois-Rivers (CA)

(73) Assignee: KOMATSU AMERICA CORP., Peoria, IL (US)

( * ) Notice: Subject to any disclaimer, the term of this patent is extended or adjusted under 35 U.S.C. 154(b) by 913 days.

(21) Appl. No.: 17/005,437

(22) Filed: Aug. 28, 2020

(65) Prior Publication Data

US 2021/0092914 A1   Apr. 1, 2021

Related U.S. Application Data

(60) Provisional application No. 62/907,160, filed on Sep. 27, 2019.

(51) Int. Cl.
| | |
|---|---|
| *A01G 23/091* | (2006.01) |
| *A01G 23/081* | (2006.01) |
| *E02F 3/36* | (2006.01) |
| *E02F 3/96* | (2006.01) |
| *E02F 9/00* | (2006.01) |

(52) U.S. Cl.
CPC ......... *A01G 23/091* (2013.01); *A01G 23/081* (2013.01); *E02F 3/369* (2013.01); *E02F 3/963* (2013.01); *E02F 9/003* (2013.01)

(58) Field of Classification Search
CPC ......... E02F 3/369; E02F 3/963; B66C 23/702
See application file for complete search history.

(56) References Cited

U.S. PATENT DOCUMENTS

| 3,085,695 | A | * | 4/1963 | Miller | E02F 9/14 |
| | | | | | 212/300 |
| 3,465,904 | A | * | 9/1969 | Pensa | E02F 3/38 |
| | | | | | 414/718 |
| 3,977,148 | A | * | 8/1976 | Ranini | E02F 3/38 |
| | | | | | 414/718 |
| 4,029,225 | A | * | 6/1977 | Wirt | E02F 3/32 |
| | | | | | 414/718 |

(Continued)

FOREIGN PATENT DOCUMENTS

JP    4239185 B2    3/2009

*Primary Examiner* — Daniel J Wiley
(74) *Attorney, Agent, or Firm* — Global IP Counselors, LLP

(57) ABSTRACT

A work implement for a work vehicle includes a boom having a chassis attachment end and an arm attachment end, an arm including a boom attachment end and a tool attachment end, and a work tool coupled to the tool attachment end of the arm. The boom attachment end is pivotally coupled to the arm attachment end of the boom. At least one of the boom and the arm includes a first portion and a second portion movably coupled to the first portion between a first orientation with respect to the first portion and a second orientation with respect to the first portion. At least one fastener is coupled between the first and second portions to selectively secure the second portion in the first orientation and the second orientation with respect to the first portion.

25 Claims, 11 Drawing Sheets

(56) References Cited

U.S. PATENT DOCUMENTS

| | | | | |
|---|---|---|---|---|
| 4,653,655 | A * | 3/1987 | Rathi | B66C 23/702 |
| | | | | 212/300 |
| 4,715,771 | A * | 12/1987 | Hanson | E02F 3/32 |
| | | | | 414/742 |
| 4,775,287 | A * | 10/1988 | Hering, Sr. | E02F 5/006 |
| | | | | 414/718 |
| 4,859,138 | A * | 8/1989 | Brocklebank | E02F 3/38 |
| | | | | 74/108 |
| 5,975,166 | A | 11/1999 | MacLennan | |
| 7,549,243 | B1 * | 6/2009 | Gilles | E02F 3/627 |
| | | | | 403/321 |
| 8,414,214 | B2 * | 4/2013 | Martin | B66C 23/702 |
| | | | | 52/646 |
| 8,850,774 | B2 * | 10/2014 | Kempf | E04B 1/2403 |
| | | | | 52/646 |
| 2002/0162435 | A1 * | 11/2002 | Purser | E02F 3/965 |
| | | | | 83/13 |
| 2008/0047171 | A1 * | 2/2008 | Jalabert | E02F 3/966 |
| | | | | 414/722 |
| 2009/0087292 | A1 * | 4/2009 | Holloway | E02F 3/382 |
| | | | | 414/723 |
| 2011/0188982 | A1 * | 8/2011 | Irieda | E02F 3/965 |
| | | | | 414/722 |
| 2015/0030425 | A1 * | 1/2015 | Oickle | E02F 3/382 |
| | | | | 414/686 |

* cited by examiner

G1< G2 < G3

G1< G2 < G3

WORK IMPLEMENT, WORK VEHICLE AND METHOD

CROSS-REFERENCE TO RELATED APPLICATIONS

This application claims the benefit of U.S. Provisional Application No. 62/907,160, filed Sep. 27, 2019. The entire disclosure of U.S. Provisional Application No. 62/907,160 is hereby incorporated herein by reference.

BACKGROUND

Field of the Invention

The present invention generally relates to a work implement, a work vehicle and a method. More specifically, the present invention relates to work implement, a work vehicle and a method, which allows for two implement portions to be mounted in different positions for work and transport.

Background Information

A work vehicle is a machine used in construction, mining, forestry, farming, etc. Such work vehicles typically have at least one work implement coupled to the vehicle body and/or chassis. The work implement is often movable but can be stationary in some cases. Such work vehicles include a ground propulsion apparatus that uses tracks or wheels to propel and/or steer the work vehicle. The tracks or wheels also serve to support the main body of the work vehicle. Some examples of a work vehicle include a bulldozer, a dump truck, a front end loader, a backhoe, an excavator, a forwarder and a feller buncher or harvester. Work vehicles are typically transported using a truck and a trailer.

SUMMARY

It has been discovered some vehicles require sufficiently long work implements in order to perform work in the field efficiently.

Therefore, one object of the present invention is to provide a work vehicle which has a sufficiently long work implement.

It has been further discovered that transporting some work vehicles can be difficult due to the height and/or length of the work implement. Specifically, a work vehicle can be too high to travel on some highways. Alternatively, a work vehicle can be too long to travel on a standard trailer, and require special transport.

Therefore, one object of the present invention is to provide a work vehicle with a work implement which can be transported on a standard trailer without being too high or too long.

In view of the state of the known technology and in accordance with a first aspect of the present disclosure, a work implement includes a boom including a chassis attachment end and an arm attachment end, an arm including a boom attachment end and a tool attachment end, and a work tool coupled to the tool attachment end of the arm. The boom attachment end is pivotally coupled to the arm attachment end of the boom. At least one of the boom and the arm includes a first portion and a second portion movably coupled to the first portion between a first orientation with respect to the first portion and a second orientation with respect to the first portion. At least one fastener is coupled between the first and second portions to selectively secure the second portion in the first orientation and the second orientation with respect to the first portion.

In accordance with a second aspect of the present disclosure, the work vehicle according to the first aspect is configured so that one of the first and second orientations is a retracted orientation, and another of the first and second orientations is an extended orientation.

In accordance with a third aspect of the present disclosure, the work vehicle according to the first or second aspect is configured so that one of the first and second orientations is a transport orientation, and another of the first and second orientations is a work orientation.

In accordance with a fourth aspect of the present disclosure, the work vehicle according to the one of the first to third aspects is configured so that the second portion is pivotally attached to the first portion such that the second portion pivots relative to the first portion about a pivot point between the first and second orientations.

In accordance with a fifth aspect of the present disclosure, the work vehicle according to one of the first to fourth aspects is configured so that one of the first and second portions includes a first stop having a first stop surface, and another of the first and second portions includes a first abutment arranged to contact the first stop surface in the first orientation, and one of the first and second portions includes a second stop having a second stop surface, and another of the first and second portions includes a second abutment arranged to contact the second stop surface in the second orientation.

In accordance with a sixth aspect of the present disclosure, the work vehicle according to the fifth aspect is configured so that the first stop surface is adjustably arranged relative to the first abutment in the first orientation, and the second stop surface is adjustably arranged relative to the second abutment in the second orientation.

In accordance with a seventh aspect of the present disclosure, the work vehicle according to the sixth aspect is configured so that the first stop includes a first cam having the first stop surface, and the second stop includes a second cam having the second stop surface. The first stop surface is movably arranged between at least two different positions, and the second stop surface is movably arranged between at least two different positions.

In accordance with an eighth aspect of the present disclosure, the work vehicle according to the seventh aspect is configured so that the first stop surface is movably arranged between three different positions, and the second stop surface is movably arranged between three different positions.

In accordance with a ninth aspect of the present disclosure, the work vehicle according to either the seventh or eighth aspect is configured so that the first cam is pivotally mounted on a first pivot pin, and the second cam is pivotally mounted on a second pivot pin. The first cam is non-rotatably mountable in the different positions using a first lock pin, and the first stop surface is spaced different distances from the first pivot pin in each of the different positions. The second cam is non-rotatably mountable in the different positions using a second lock pin, and the second stop surface is spaced different distances from the second pivot pin in each of the different positions.

In accordance with a tenth aspect of the present disclosure, the work vehicle according to the ninth aspect is configured so that one of the first cam and the one of the first and second portions that includes the first stop has a number of first mounting holes corresponding to the number of positions of the first stop surface, and one of the second cam and the one of the first and second portions that includes the second stop has a number of second mounting holes corresponding to the number of positions of the second stop surface.

In accordance with an eleventh aspect of the present disclosure, the work vehicle according to one of the fifth to tenth aspects is configured so that the first portion includes the first stop and the second portion includes the first abutment.

In accordance with a twelfth aspect of the present disclosure, the work vehicle according to one of the fifth to eleventh aspects is configured so that the first portion includes the second stop and the second portion includes the second abutment.

In accordance with a thirteenth aspect of the present disclosure, the work vehicle according to one of the first to fourth aspects is configured so that one of the first and second portions includes a pair of first stops, and one of the first and second portions includes a pair of second stops. Each first stop has a first stop surface, and another of the first and second portions includes a pair of first abutments arranged to contact the first stop surfaces in the first orientation. Each second stop has a second stop surface, and another of the first and second portions includes a pair of second abutments arranged to contact the second stop surfaces in the second orientation.

In accordance with a fourteenth aspect of the present disclosure, the work vehicle according to one of the first to thirteen aspects is configured so that one of the first and second portions includes first and second fastener openings, and another of the first and second portions includes a common fastener opening. The fastener is received in the first fastener opening and the common fastener opening when the second portion is in the first orientation with respect to the first portion. The fastener is received in the second fastener opening and the common fastener opening when the second portion is in the second orientation with respect to the first portion.

In accordance with a fifteenth aspect of the present disclosure, the work vehicle according to the fourteenth aspect is configured so that the first portion includes the first and second fastener openings, and the second portion includes the common fastener opening.

In accordance with a sixteenth aspect of the present disclosure, the work vehicle according to the fourteenth or fifteenth aspect is configured so that at least one cover is arranged to cover the first fastener opening when the second portion is in the second orientation with respect to the first portion, and the second fastener opening when the second portion is in the first orientation with respect to the first portion.

In accordance with a seventeenth aspect of the present disclosure, the work vehicle according to one of the first to sixteenth aspects is configured so that the arm includes the first portion and the second portion.

In accordance with an eighteenth aspect of the present disclosure, the work vehicle according to the seventh aspect if configured so that the first portion is a first arm portion having the boom attachment end and the second portion is a second arm portion having the tool attachment end.

In accordance with a nineteenth aspect of the present disclosure, the work vehicle according to the eighteenth aspect is configured so that the first arm portion has a first length and the second arm portion has a second length shorter than the first length.

In accordance with a twentieth aspect of the present disclosure, the work vehicle according to the nineteenth aspect is configured so that the first length is at least three times the second length.

In accordance with a twenty-first aspect of the present disclosure, the work vehicle according to the twentieth aspect is configured so that the first length is at least four times the second length.

In accordance with a twenty-second aspect of the present disclosure, the work vehicle according to the first length is at least five times the second length.

In accordance with a twenty-third aspect of the present disclosure, the work vehicle according to one of the first to twenty-second aspects is configured so that the second portion is substantially collinear with the first portion in one of the first and second orientations, and the second portion is angled about 90 degrees relative to the first portion in another of the first and second orientations.

In accordance with a twenty-fourth aspect of the present disclosure, the work vehicle according to one of the first to twenty-third aspects is configured so that the boom has a length of at least four meters, and the arm has a length of at least four meters.

In accordance with a twenty-fifth aspect of the present disclosure, the work vehicle according to the twenty-fourth aspect is configured so that the boom has a length of about five meters, and the arm has a length of about five meters.

In accordance with a twenty-sixth aspect of the present disclosure, the work vehicle according to one of the first to twenty-fifth aspects is configured so that the work tool includes a harvester head.

In accordance with a twenty-seventh aspect of the present disclosure, the work vehicle according to one of the first to twenty-sixth aspects further includes a ground propulsion apparatus, a chassis supported by the ground propulsion apparatus, and a vehicle body supported by the chassis. The chassis attachment end of the boom are attached to at least one of the chassis and vehicle body.

A method of moving a portion of a work implement of a work vehicle according to a twenty-eighth aspect of the present disclosure for a work implement including a boom, an arm and a work tool is provided. At least one fastener holding a second portion of the work implement in a first orientation with respect to a first portion of the work implement is released. The second portion is moved from the first orientation to a second orientation different from the first orientation. The fastener are attached to hold the second portion of the work implement in the second orientation with respect to the first portion.

Also other objects, features, aspects and advantages of the disclosed work vehicle will become apparent to those skilled in the work vehicle field from the following detailed description, which, taken in conjunction with the annexed drawings, discloses exemplary embodiments of the work vehicle.

BRIEF DESCRIPTION OF THE DRAWINGS

Referring now to the attached drawings which form a part of this original disclosure.

DETAILED DESCRIPTION OF THE EMBODIMENT(S)

A selected embodiment will now be explained with reference to the drawings. It will be apparent to those skilled in the art from this disclosure that the following description of the embodiment is provided for illustration only and not for the purpose of limiting the invention as defined by the appended claims and their equivalents.

Figure 1:
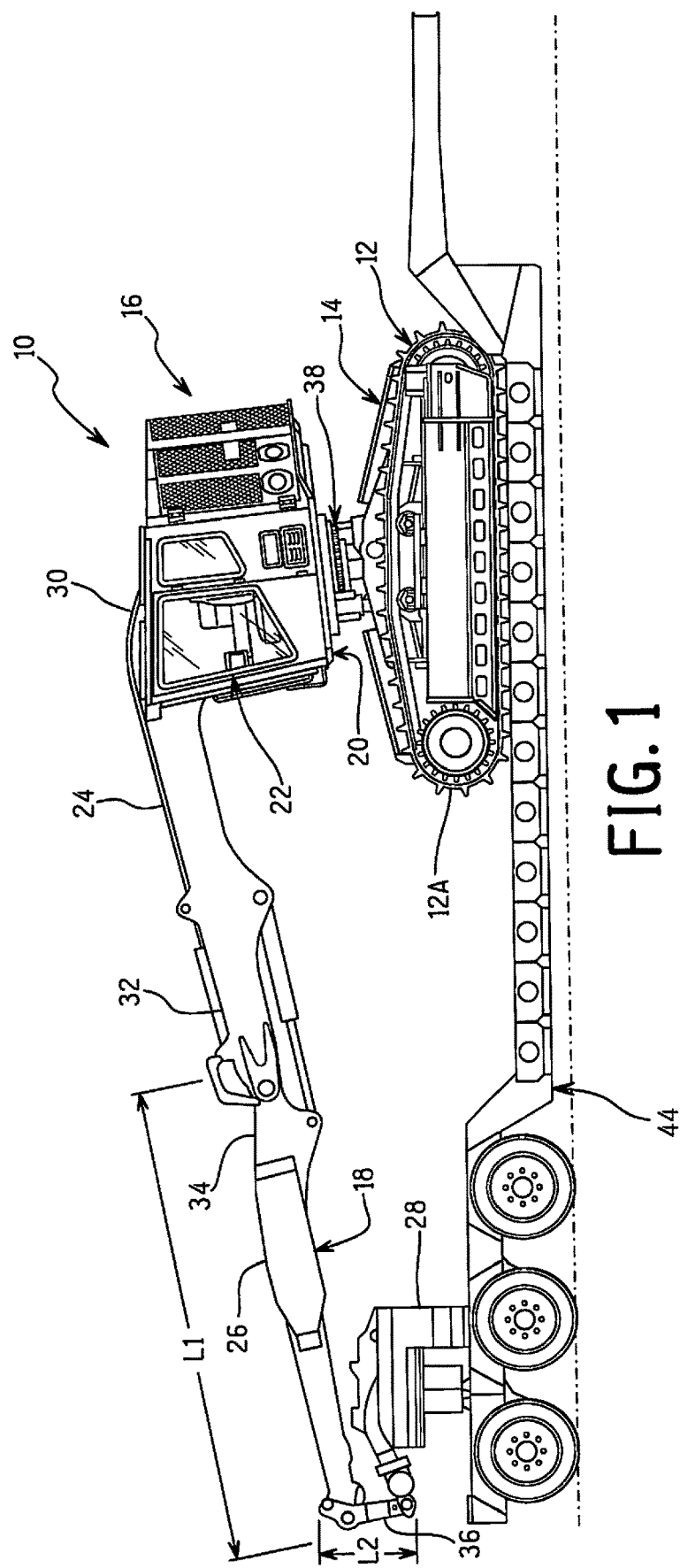
FIG. 1 is a left side perspective view of a work vehicle in accordance with a first embodiment, with the work vehicle on a trailer and the work implement extended but with the work tool in a transport/retracted position.

Referring initially to FIG. 1, a work vehicle 10 is illustrated in accordance with one illustrated embodiment. As explained below, the work vehicle 10 is configured to improve transportation of work vehicle having a sufficiently long work implement. In the illustrated embodiment, the work vehicle 10 is a tree harvester, such as a short tail tracked harvester. While it will be apparent to those skilled in the art from this disclosure that certain aspects may be particularly beneficial in a tree harvester, it will also be apparent that many of the aspects of the work vehicle 10 can be applied to other types of work vehicles.

In the illustrated embodiment, the work vehicle 10 is a tracked work vehicle that includes a ground propulsion apparatus 12, a chassis 14, a vehicle body 16, and a work implement 18. The ground propulsion apparatus 12 has a pair of tracks used to propel and maneuver the work vehicle 10 in a conventional manner. However, it will be apparent to those skilled in the work vehicle field from this disclosure that the present invention is also applicable the wheeled work vehicles in which the tracks are replaced by wheels. The ground propulsion apparatus 12 supports the chassis 14, which supports the vehicle body 16. The vehicle body 16 is pivotally supported by and attached to the ground propulsion apparatus 12 via the chassis 14. The work implement 18 is movably attached to the vehicle body 16. The vehicle body 16 includes a deck 20 on which an operator cab 22 is disposed and from which an operator can operate the work vehicle 10. While the drawing figures generally illustrate the work vehicle 10 from a left side, the right side of the work vehicle is similarly configured and is substantially a mirror image of the left side.

Figure 6:
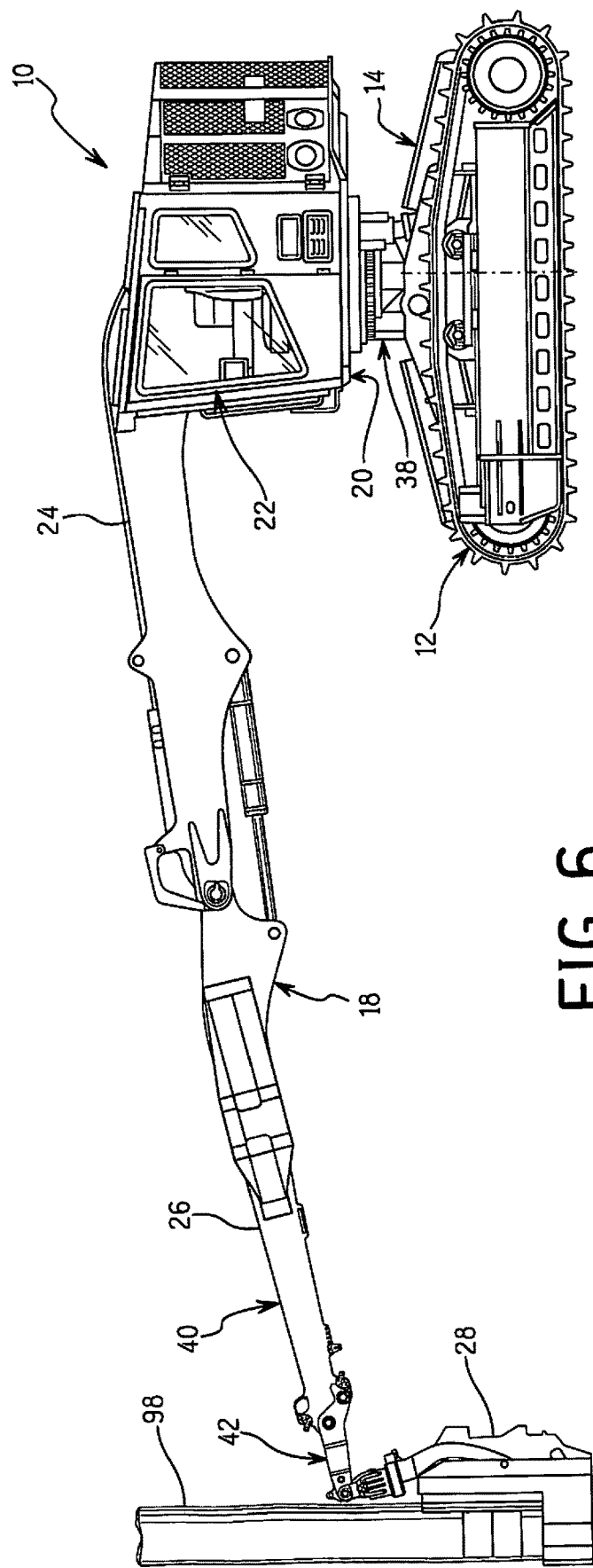
FIG. 6 is a left side perspective view of the work vehicle of FIG. 1 in which the boom and the arm of the work implement are in a first orientation during operation of the work vehicle.
Figure 7:
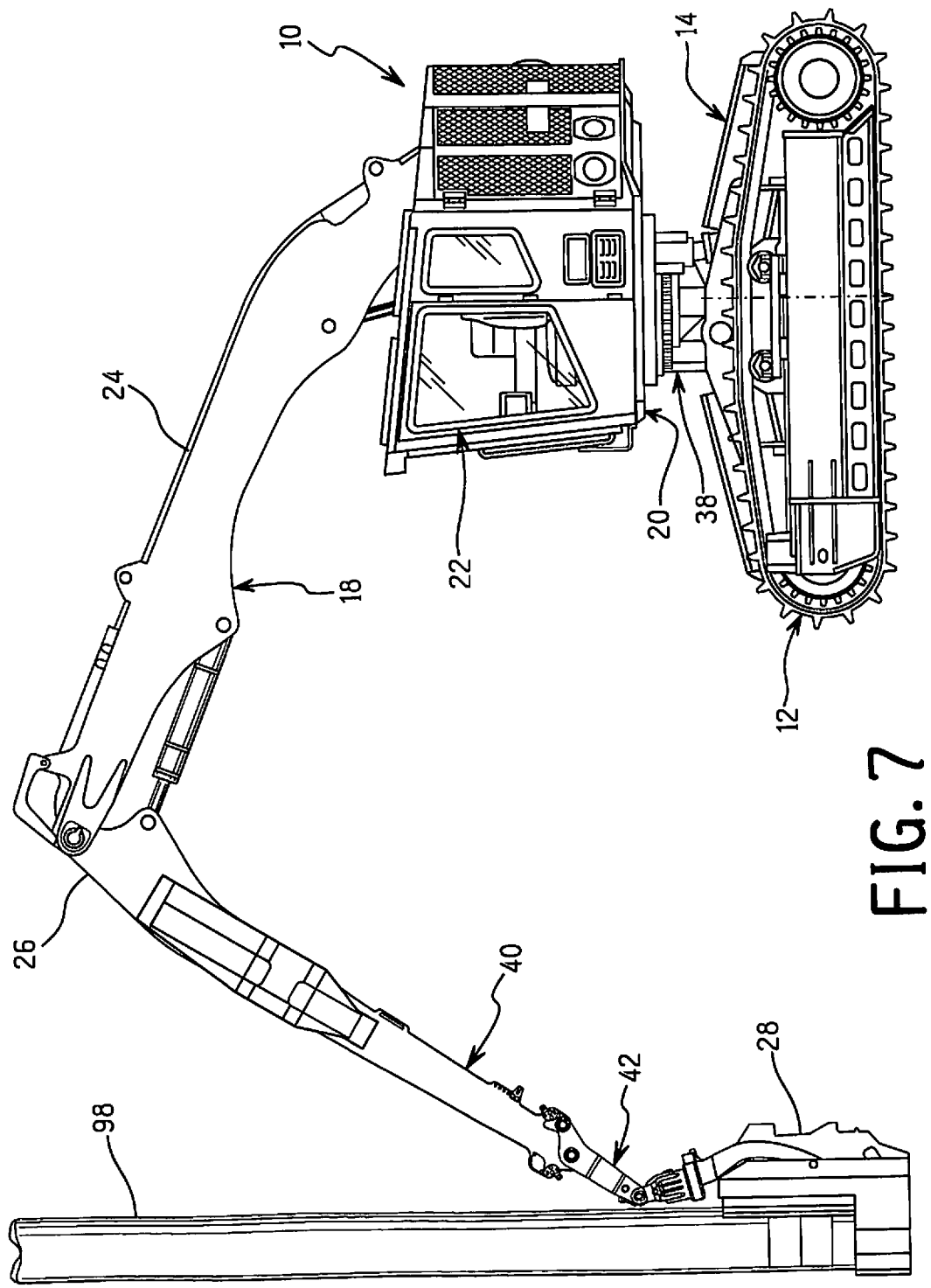
FIG. 7 is a left side perspective view of the work vehicle of FIG. 1 in which the boom and the arm of the work implement are in a second orientation during operation of the work vehicle.
Figure 8:
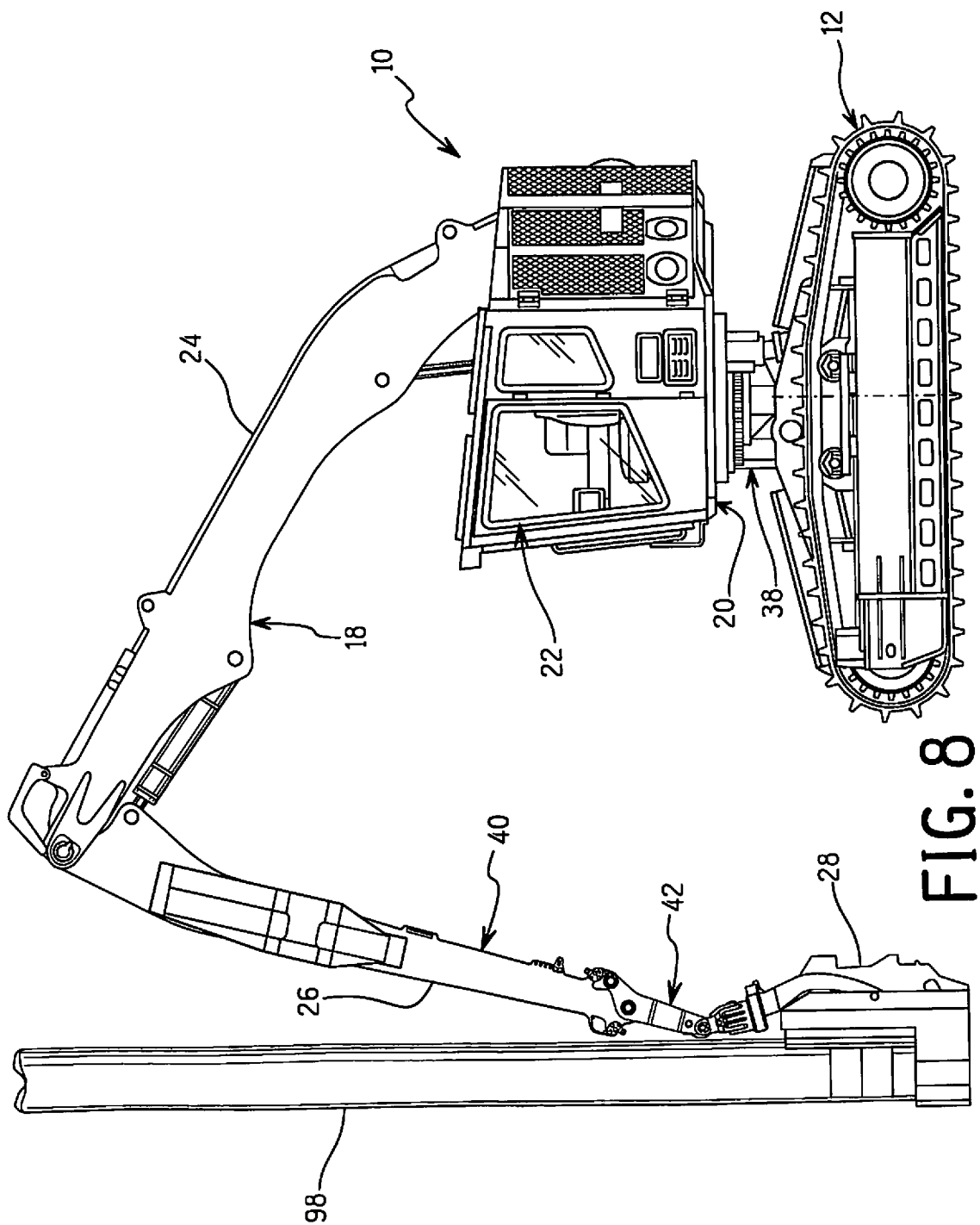
FIG. 8 is a left side perspective view of the work vehicle of FIG. 1 in which the boom and the arm of the work implement are in a third orientation during operation of the work vehicle.

In the illustrated embodiment, the work implement 18 includes a boom 24, an arm 26 and an attachment or work tool 28. In the illustrated embodiment, the work tool 28 is a harvester head/attachment that includes a high-speed disc saw. The boom 24 has a chassis attachment end 30 and an arm attachment end 32. The chassis attachment end 30 is movably attached to at least one of the chassis 14 and the vehicle body 16. The arm attachment end 32 attached to the arm 18. The arm 26 has a boom attachment end 34 and a tool attachment end 36. The boom attachment end 34 is pivotally coupled to the arm attachment end 34. The work tool 28 is coupled to the tool attachment end 36 of the arm 26. A pivotal connection attaches the boom 24 to the arm 26 in a conventional manner, such that the work vehicle can be operated with the boom 24 and the arm 26 in a plurality of orientations, as shown in FIGS. 6-8. The boom 24 and the arm 26 are operated using a hydraulic system in a conventional manner. While in the illustrated embodiment, the work vehicle 10 is a track harvester in which the work implement 18 includes the boom 24, the arm 26, and the harvester head/attachment as the work tool 28, it will be apparent to those skilled in the art from this disclosure that the present invention is applicable to any work vehicle having any work implement (e.g., a bucket, excavator, bulldozer blade, front end loader, etc.). Nevertheless, the present invention is particularly suited to harvesters, which have a particular long work implement 18.

The ground propulsion apparatus 12 of the illustrated embodiment includes an undercarriage and other conventional parts that enable the work vehicle 10 to move along a ground surface. In the illustrated embodiment, the ground propulsion apparatus 12 includes a left or first track 12A and a right or second track (not shown). The first and second tracks are arranged to contact the ground surface. The first and second tracks are driven by, for example, a hydraulic motor (not shown). In the illustrated embodiment, the work vehicle 10 is a short tail tracked harvester in that the rear end of the vehicle body 16 does not extend beyond the first and second tracks. In other words, a rearmost portion of the vehicle body 16 is positioned forward with respect to a rearmost end of the first and second tracks when the vehicle body 16 is oriented facing forward without a swing angle, as shown in FIGS. 6 to 8. Although the ground propulsion apparatus 12 of the illustrated embodiment has the first and second tracks, the invention is not limited to a work vehicle that uses tracks. For example, the ground propulsion apparatus 12 can include wheels or some other means of moving the work vehicle 10 along the ground.

As shown in FIG. 1, the chassis 14 is basically a frame to which the ground propulsion apparatus 12 is attached. The chassis 14 is supported with respect to the ground surface by the ground propulsion apparatus 12 and serves to support the vehicle body 16 with respect to the ground propulsion apparatus 12. The chassis 14 is configured to support a swing apparatus 38 that supports the vehicle body 16. The swing apparatus 38 includes a swing bearing and a swing motor. In the illustrated embodiment, the swing motor, the swing bearing, and the vehicle body 16 are coupled together such that the vehicle body 16 can be rotated about a vertical swing axis by the swing motor. The vehicle body 16 is supported on the swing apparatus 38 such that the vehicle body 16 is swingably mounted to the chassis 14 about the vertical swing axis. Although the illustrated embodiment is provided with the swing apparatus 38, the invention is not limited to a work vehicle that includes a swing apparatus. The vehicle body 16 can be non-rotatable or fixed with respect to the chassis 14.

The operator cab 22 includes a driver's seat and various operating members used by the operator to operate the work vehicle 10, as shown in FIG. 1. In the illustrated embodiment, operating members are provided to be operated by hand, and pedal type operating members are provided on the floor to be operated by foot. There are no particular limitations on the arrangement and type of operating members provided in the operator cab 22. The operating members are preferably arranged in positions where they are easy for the operator to access and do not obstruct the operator's field of view.

Figure 2:
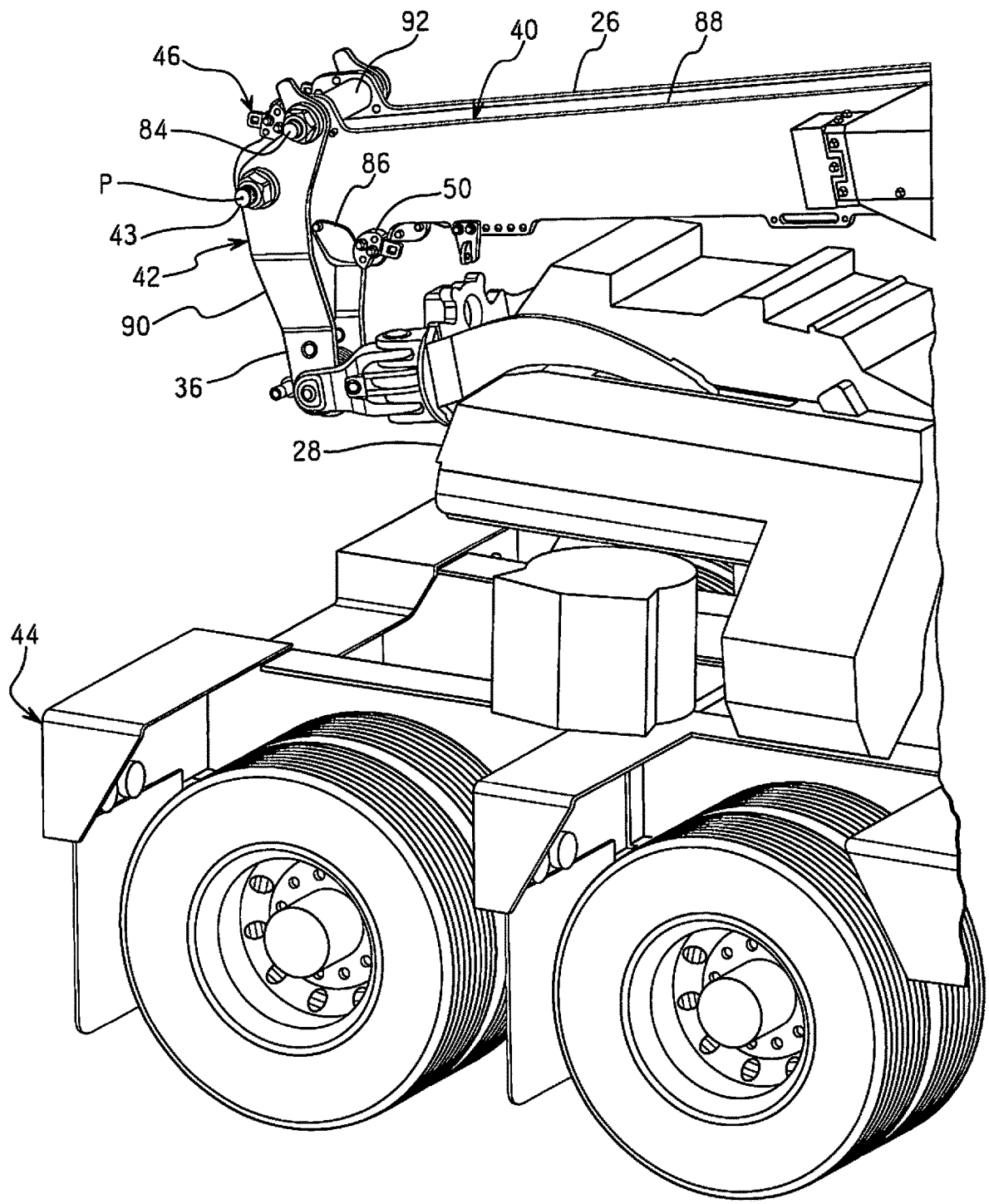
FIG. 2 is an enlarged left front side perspective view of the work tool of the work vehicle illustrated in FIG. 1, with the work implement extended but with the work tool in a transport/retracted position.
Figure 3:
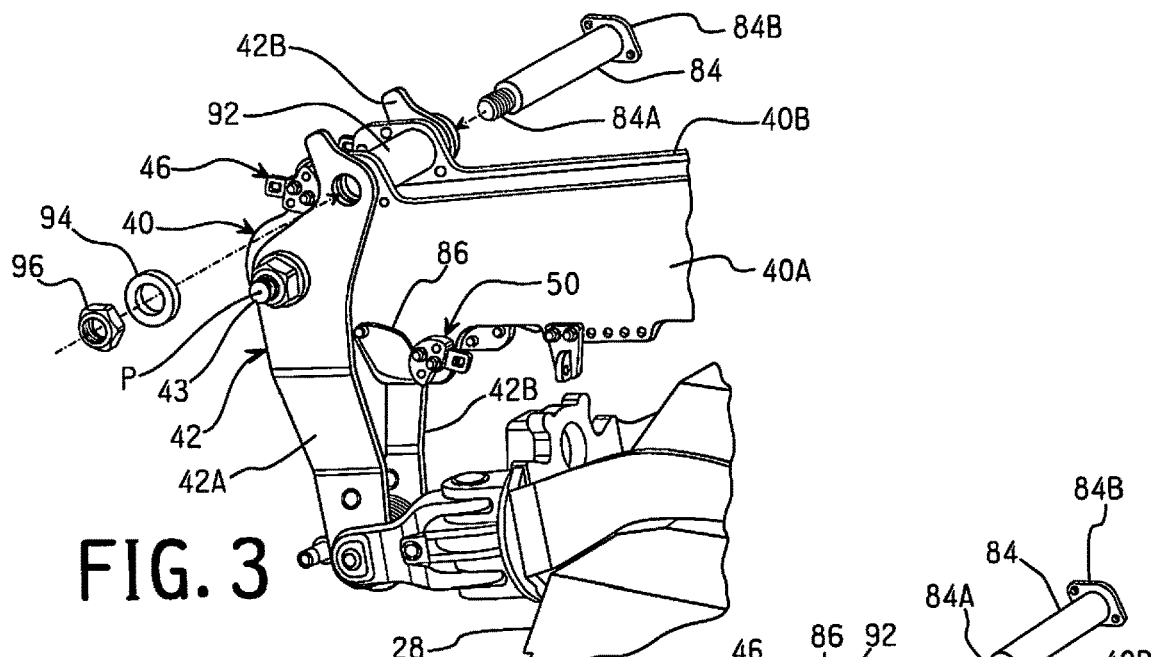
FIG. 3 is an exploded perspective view of an arm of the work implement of FIG. 1 in a transport/retracted position.
Figure 4:
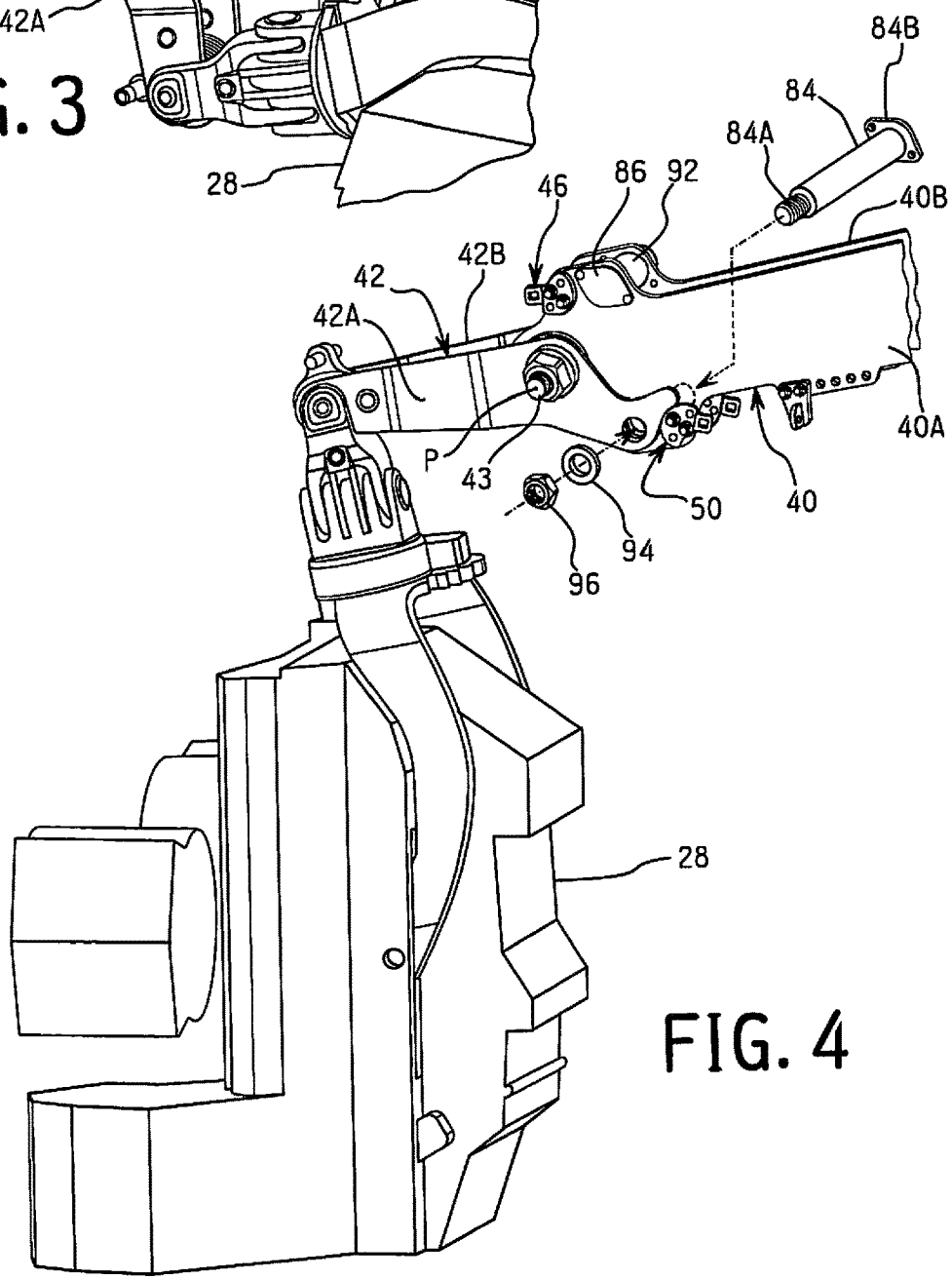
FIG. 4 is an exploded perspective view of an arm of the work implement of FIG. 1 in an extended orientation.
Figure 5:
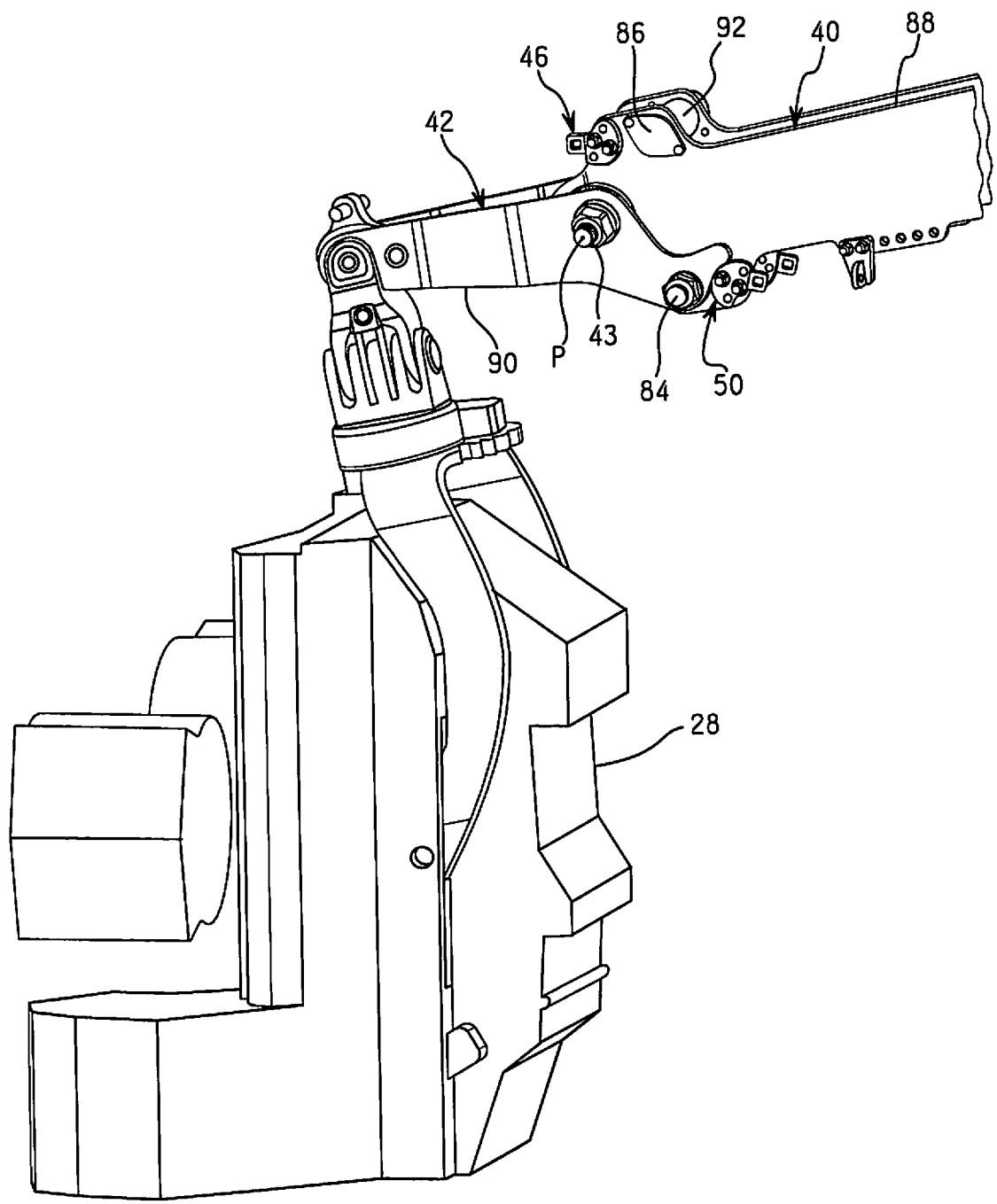
FIG. 5 is a left side perspective view of the arm of the work implement of FIG. 4 in the extended position.

The arm 26 includes a first portion 40 and a second portion 42 movably coupled to the first portion 40, as shown in FIGS. 2-5. The second portion 42 is movably coupled to the first portion 40 between a first orientation, as shown in FIGS. 2 and 3, and a second orientation, as shown in FIGS. 4 and 5. The second portion 42 is pivotally attached to the first portion 40 such that the second portion 42 pivots relative to the first portion 40 about a pivot axis P between the first and second orientations, as shown in FIGS. 3 and 4. The first orientation is a retracted, or transportation, orientation to facilitate transporting the work vehicle 10 on a trailer 44, as shown in FIG. 1. In the first orientation, the overall length of the work vehicle 10 is reduced such that the trailer 44 does not require a special escort or extended transport bed, as shown in FIG. 1. The second orientation, as shown in FIGS. 4 and 6-8, is an extended, or work, orientation. The second portion 42 is angled about ninety degrees relative to the first portion 40 in the first orientation, as shown in FIGS. 2 and 3. The second portion 42 is substantially collinear with the first portion 40 in the second orientation, as shown in FIGS. 4 and 5. Alternatively, the second portion is substantially collinear with the first portion in the first orientation, and the second portion is angled about ninety degrees relative to the first portion 40 in the second orientation. In other words, the second portion is substantially collinear with the first portion in one of the first and second orientations, and the second portion is angled about ninety degrees relative to the first portion in another of the first and second orientations.

As shown in FIGS. 1 and 6-8, the boom 24 has a length of at least four meters, and the arm 26 has a length of at least four meters. Alternatively, the boom 24 has a length of at least five meters, and the arm 26 has a length of at least five meters. The present invention is equally applicable to a work implement having a boom and arm of any length. However, if the work implement is not very long, height and length challenges during transport may not be as prevalent. One of the first and second portions is selectively secured in first and second orientations with respect to the other of the first and second portions allows the overall length of the work vehicle 10 to be reduced such that the work vehicle 10 can be transported by a trailer 44 without requiring special transport or accommodations.

As shown in FIGS. 2-5, the arm 26 includes the first portion 40 and the second portion 42. The first portion 40 is a first arm portion 88 having the boom attachment end 34 and the second portion 42 is a second arm portion 90 having the tool attachment end 36. The first arm portion 88 has a first length L1 and the second arm portion 90 has a second length L2, as shown in FIG. 1. The first length L1 is preferably at least three times the second length L2. Preferably, the first length L1 is preferably at least four times the second length L2. More preferably, the first length L1 is preferably at least five times the second length L2.

The first portion 40 includes a first stop 46 having a first stop surface 48 and a second stop 50 having a second stop surface 52, as shown in FIGS. 3, 4, 19 and 20. The second portion 42 includes a first abutment 54 arranged to contact the first stop surface in the first orientation, as shown in FIGS. 3, 12-14 and 15. The second portion 42 includes a second abutment 56 arranged to contact the second stop surface 52 in the second orientation, as shown in FIGS. 4, 9-11 and 15. The second portion 42 pivots approximately ninety degrees between the first orientation and the second orientation, although the first and second stops 46 and 50 can be disposed in any suitable location to control the pivot angle. Alternatively, the second portion 42 can include the first and second stops 46 and 50, and the first portion 40 can include the first and second abutments 54 and 56.

Figure 19:
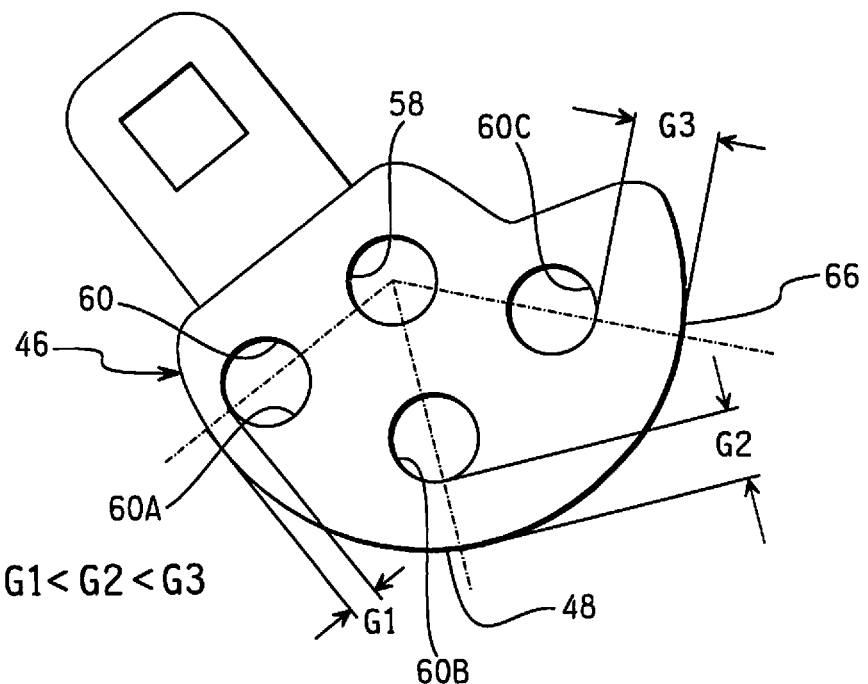
FIG. 19 is a left side elevational view of the cam of FIG. 12.

The first stop 46, as shown in FIG. 19, has a pivot hole 58 and a plurality of mounting holes 60. The pivot hole 58 receives a first pivot pin 62 about which the first stop 46 is configured to pivot. The first stop 46 is illustrated with three mounting holes 60A, 60B and 60C, although the first stop 46 can have any suitable number of mounting holes to control the degree of adjustability of the first stop. A first lock pin 64 is received by one of the mounting holes 60 to control the position of the work tool 28. The plurality of mounting holes 60 allows the first stop surface 48 to be adjustably arranged relative to the first abutment 54 in the first orientation, as shown in FIG. 3. The three mounting holes 60A, 60B and 60C allow the first stop surface 48 to be movably arranged between three different positions.

As shown in FIG. 19, the first stop 46 includes a first cam 66 having the first stop surface 48. The plurality of mounting holes 60 allows the first stop surface 48 to 48 be movably arranged between at least two positions.

Figure 20:
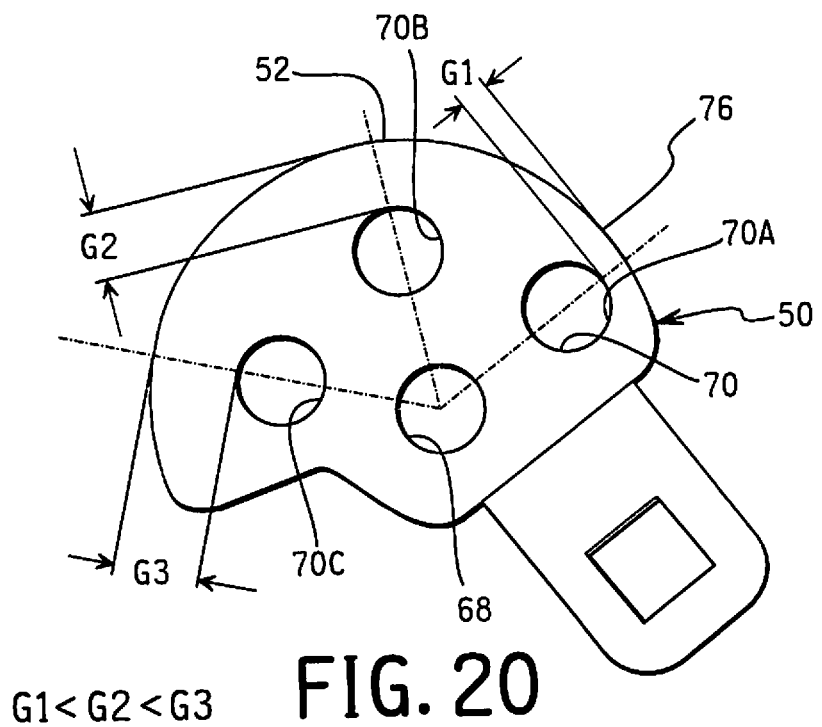
FIG. 20 is a left side elevational view of the cam of FIG. 9.

The second stop 50, as shown in FIG. 20, has a pivot hole 68 and a plurality of mounting holes 70. The pivot hole 68 receives a second pivot pin 72 about which the second stop 50 is configured to pivot. The second stop 50 is illustrated with three mounting holes 70A, 70B and 70C, although the second stop 50 can have any suitable number of mounting holes 70 to control the degree of adjustability of the second stop 50. A second lock pin 74 is received by one of the mounting holes 70 to control the position of the work tool 28. The plurality of mounting holes 70 allows the second stop surface 52 to be adjustably arranged relative to the second abutment 56 in the second orientation, as shown in FIG. 4. The three mounting holes 70A, 70B and 70C allow the second stop surface 52 to be movably arranged between three different positions.

As shown in FIG. 20, the second stop 50 includes a second cam 76 having the second stop surface 52. The plurality of mounting holes 70 allows the second stop surface 52 to be movably arranged between at least two positions.

Figure 11:
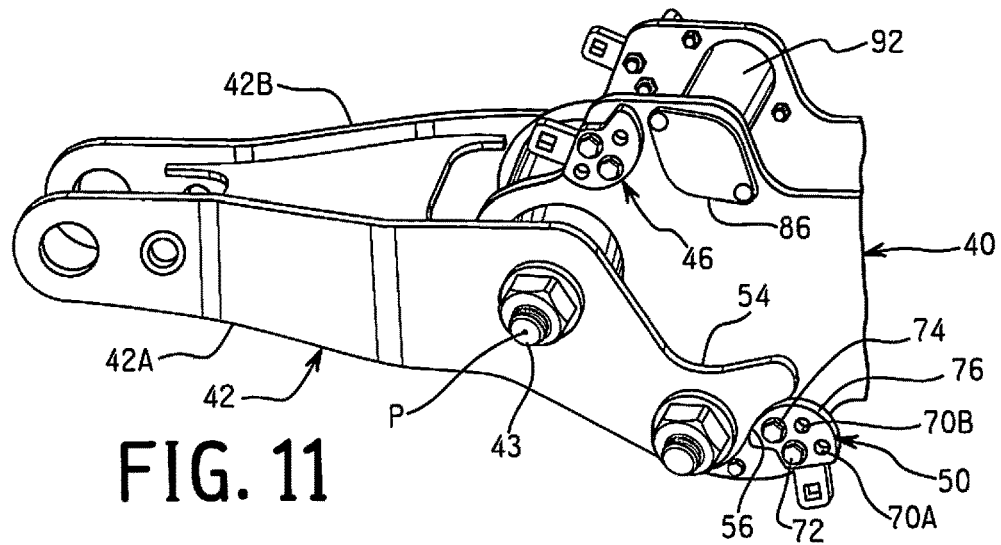
FIG. 11 is left side perspective view of the arm of the work implement of FIG. 9 in the extended position in which the cam is in a third position.
Figure 12:
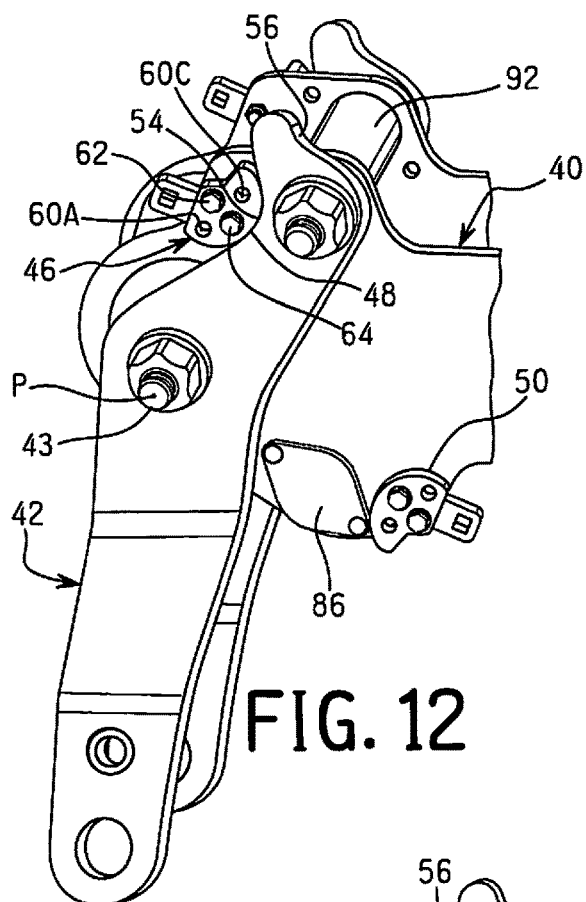
FIG. 12 is left side perspective view of the arm of the work implement of FIG. 3 in the transport/retracted position in which a cam is in a first position.
Figure 13:
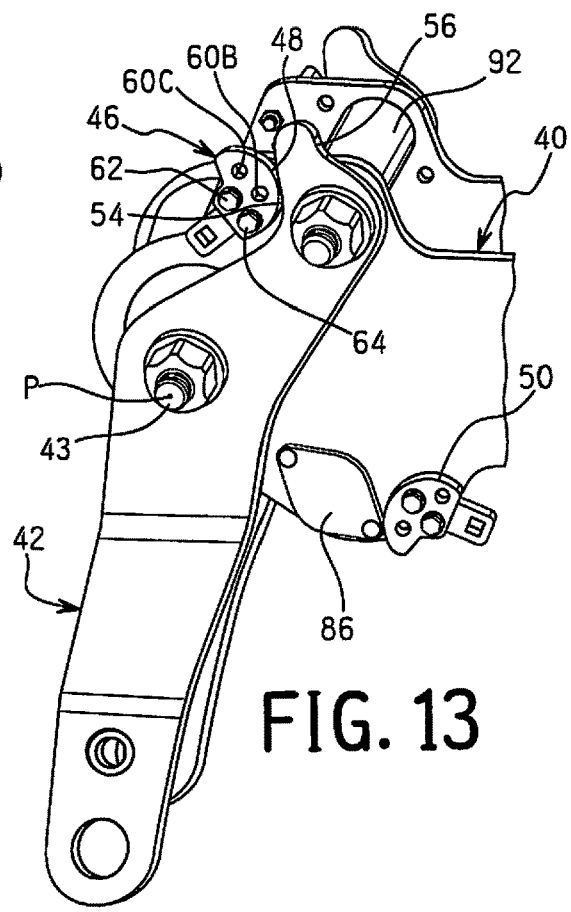
FIG. 13 is left side perspective view of the arm of the work implement of FIG. 12 in the transport/retracted position in which a cam is in a second position.
Figure 14:
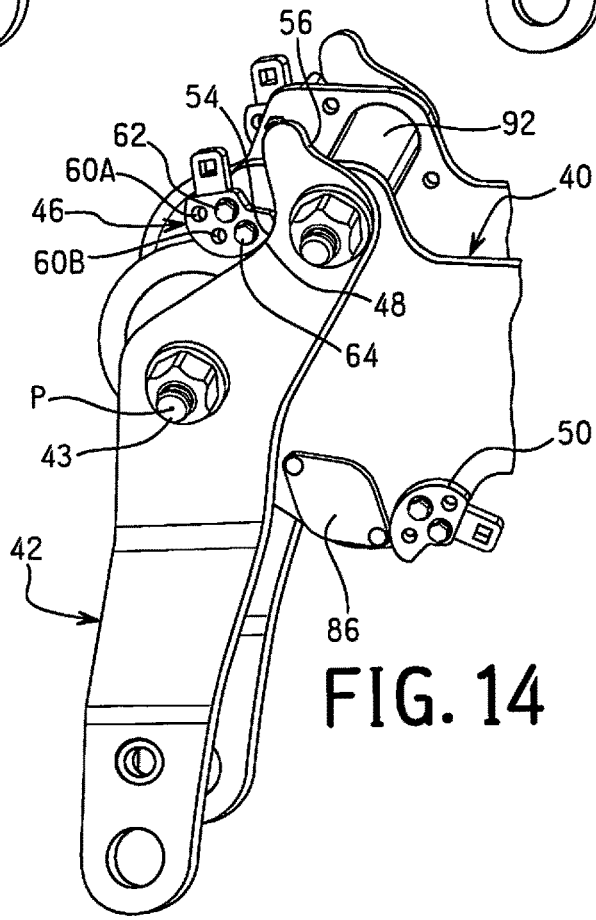
FIG. 14 is left side perspective view of the arm of the work implement of FIG. 12 in the transport/retracted position in which a cam is in a third position.

As shown in FIGS. 12-14, the first cam 66 is pivotally mounted on the first pivot pin 62. The first cam 66 is non-rotatably mountable in the different positions using the first lock pin 64. The first stop surface 48 is spaced different distances from the first pivot pin 62 in each of the different positions. Each position corresponds to the first lock pin 62 being received by one of the plurality of mounting holes 60. As shown in FIG. 19, the first mounting hole 60A is spaced a first distance G1 from the first stop surface 48. The first distance G1 is measured on a line extending between centers of the pivot hole 58 and the first mounting hole 60A to the first stop surface 48. The second mounting hole 60B is spaced a second distance G2 from the first stop surface 48. The second distance G2 is measured on a line extending between centers of the pivot hole 58 and the second mounting hole 60B to the first stop surface 48. The third mounting hole 60C is spaced a third distance G3 from the first stop surface 48. The third distance G3 is measured on a line extending between centers of the pivot hole 58 and the third mounting hole 60C to the first stop surface 48. Preferably, G1 is smaller than G2, which is smaller than G3. In other words, G1<G2<G3. The centers of the first, second and third mounting holes 60A, 60B and 60C are preferably equally spaced from the center of the pivot hole 58. The number of mounting holes 60 corresponds to the number of positions of the first stop surface 48, as shown in FIGS. 10-12.

Figure 9:
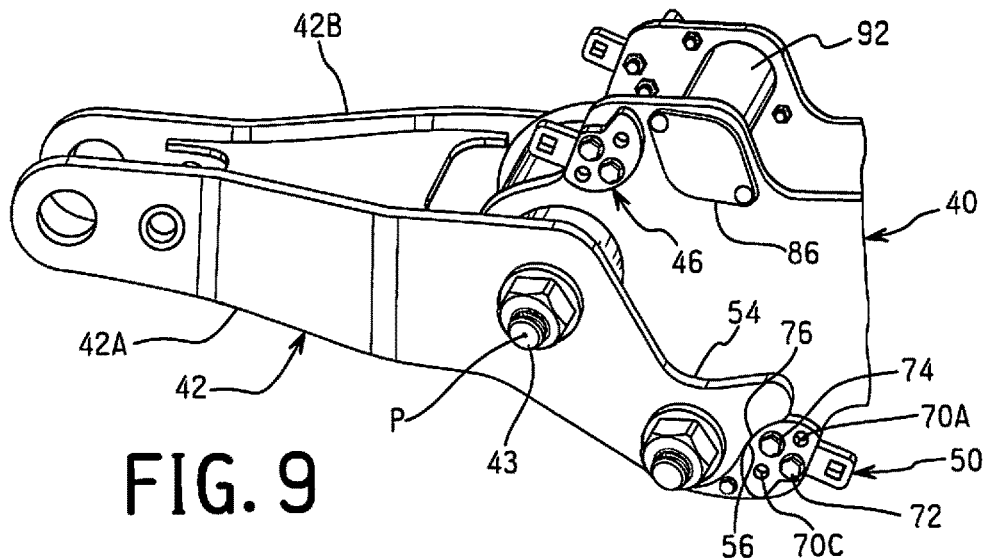
FIG. 9 is left side perspective view of the arm of the work implement of FIG. 4 in the extended position in which a cam is in a first position.
Figure 10:
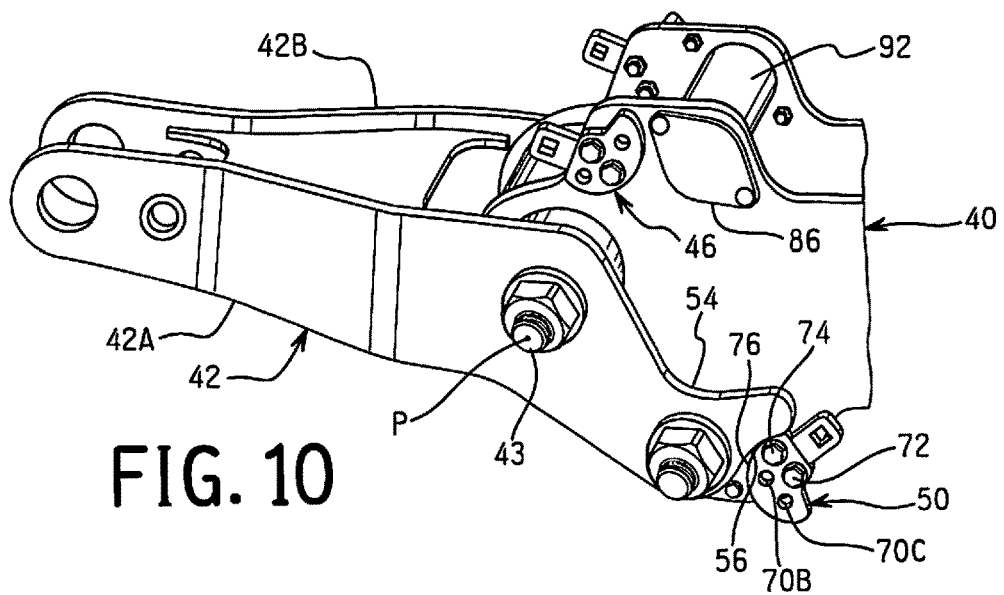
FIG. 10 is left side perspective view of the arm of the work implement of FIG. 9 in the extended position in which the cam is in a second position.

As shown in FIGS. 9-11, the second cam 76 is pivotally mounted on the second pivot pin 72. The second cam 76 is non-rotatably mountable in the different positions using the second lock pin 74. The second stop surface 56 is spaced different distances from the second pivot pin 72 in each of the different positions. As shown in FIG. 20, the second mounting hole A is spaced a first distance G1 from the second stop surface 52. The first distance G1 is measured on a line extending between centers of the pivot hole 68 and the first mounting hole 70A to the second stop surface 52. The second mounting hole 70B is spaced a second distance G2 from the second stop surface 52. The second distance G2 is measured on a line extending between centers of the pivot hole 68 and the second mounting hole 70B to the second stop surface 52. The third mounting hole 70C is spaced a third distance G3 from the second stop surface 52. The third distance G3 is measured on a line extending between centers of the pivot hole 68 and the third mounting hole 70C to the second stop surface 52. Preferably, G1 is smaller than G2, which is smaller than G3. In other words, G1<G2<G3. The centers of the first, second and third mounting holes 70A, 70B and 70C are preferably equally spaced from the center of the pivot hole 68. The number of mounting holes 70 corresponds to the number of positions of the second stop surface 52, as shown in FIGS. 9-11.

As shown in FIGS. 9-14, the first portion 40 includes the first stop 46 and the second portion 42 includes the first abutment 54. The first portion 40 includes the second stop 50 and the second portion 42 includes the second abutment 56. Alternatively, the second portion includes the first and second stops and the first portion includes the first and second abutments.

As shown in FIGS. 9-14, one of the first and second portions includes a pair of first stops, each first stop having a first stop surface, and another of the first and second portions includes a pair of first abutments arranged to contact the first stop surfaces in the first orientation. One of the first and second portions includes a pair of second stops, each second stop having a second stop surface, and another of the first and second portions includes a pair of second abutments arranged to contact the second stop surfaces in the second orientation. The first and second portions 40 and 42 each include first and second members 40A and 40B and 42A and 42B that are mirror images of one another, respectively. Each of the first and second members 40A and 40B of the first portion 40 includes aligned first and second stops 46 and 52. Each of the first and second members 42A and 42B of the second portion 42 includes aligned first and second abutments 54 and 56 configured to engage the first and second stops 46 and 52 in the first and second orientations. The pair of first abutments 54 are arranged to contact the first stop surfaces 48 of the pair of first stops 46 in the first orientation, as shown in FIGS. 12-14. The pair of second abutments 56 are arranged to contact the second stop surfaces 52 of the pair of second stops 50 in the second orientation, as shown in FIGS. 9-11.

Figure 15:
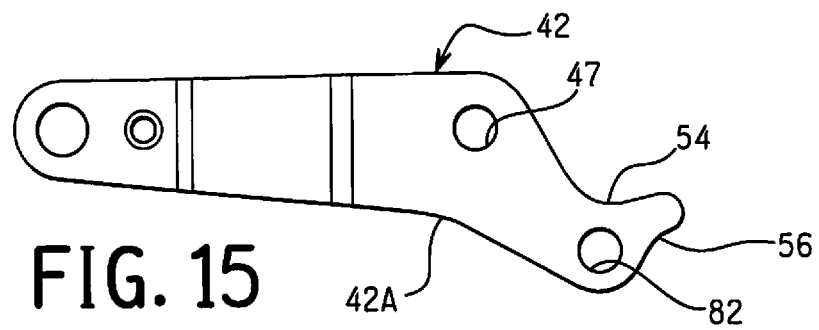
FIG. 15 is a left side elevational view of the arm of the work implement of FIG. 4.
Figure 17:
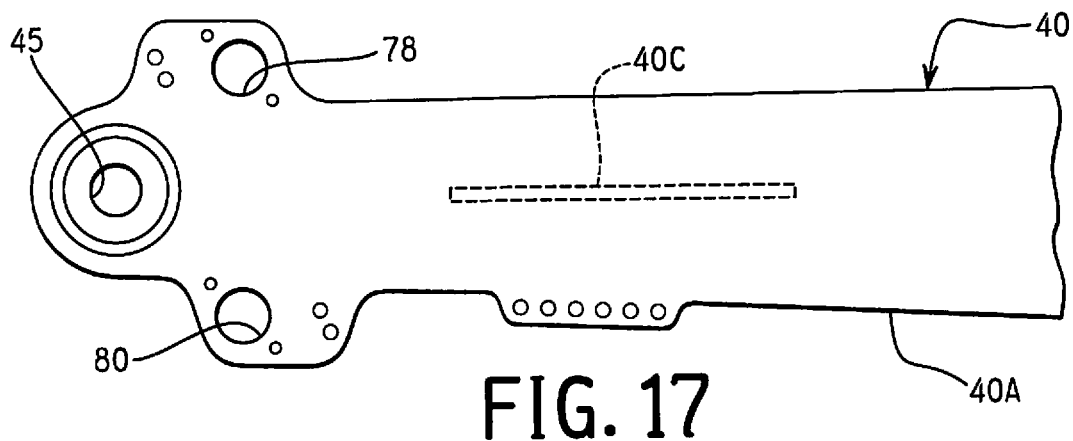
FIG. 17 is a partial left side elevational view of the boom of the work implement of FIG. 2.

As shown in FIGS. 15 and 17, the first portion 40 includes first and second fastener openings 78 and 80, and the second portion 42 includes a common fastener opening 82. At least one fastener 84 is coupled between the first portion 40 and the second portion 42 to selectively secure the second portion 42 in the first orientation (FIG. 3) and the second orientation (FIG. 4) with respect to the first portion 40. The fastener 84 is received in the first fastener opening 78 and the common fastener opening 82 when the second portion 42 is in the first orientation with respect to the first portion 40, as shown in FIG. 3. The fastener 84 is received in the second fastener opening 80 and the common fastener opening 82 when the second portion 42 is in the second orientation with respect to the first portion 40, as shown in FIG. 3. As shown in FIG. 13, the first portion 40 includes the first and second fastener openings 78 and 80, and the second portion 42 includes the common fastener opening 82. Alternatively, the second portion includes the first and second fastener openings, and the first portion includes the common fastener opening.

At least one cover 86 covers the first fastener opening 78 or the second fastener opening 80 in the first portion 40 that does not receive the fastener 84, as shown in FIGS. 3 and 4. The at least one cover 86 is arranged to cover the first fastener opening 78 when the second portion 42 is in the second orientation with respect to the first portion 40, as shown in FIG. 3. The at least one cover 86 is arranged to cover the second fastener opening 80 when the second portion 42 is in the first orientation with respect to the first portion 40, as shown in FIG. 4.

Figure 18:
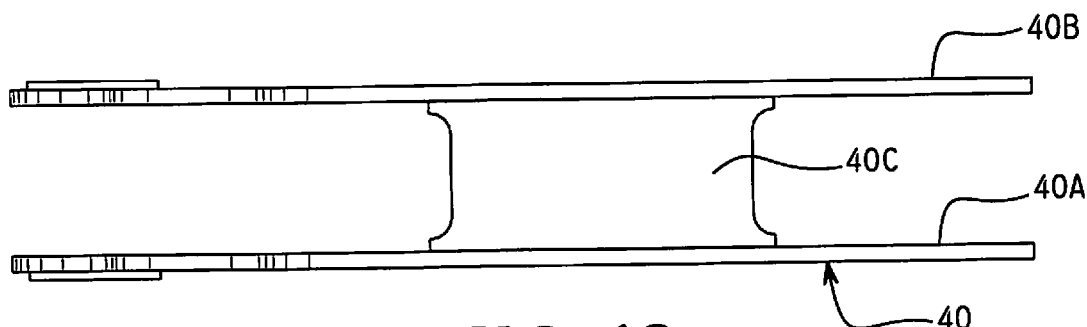
FIG. 18 is a partial top plan view of the boom of FIG. 17.

As shown in FIG. 18, the first portion 40 includes first and second members 40A and 40B that are spaced apart from one another and rigidly connected together. The first and second members 40A and 40B of the first portion 40 are preferably mirror images of one another, as shown in FIGS. 17 and 18. A web member 40C rigidly connects the first and second members 40A and 40B of the first portion 40. As shown in FIG. 5, a bushing 92 extends between each of the oppositely disposed first and second fastener openings 78 and 80 in the first and second members 40A and 40B of the first portion 40.

Figure 16:
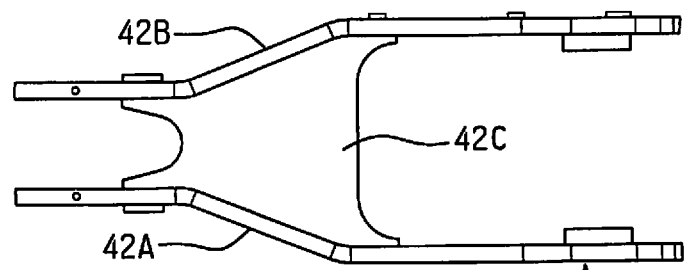
FIG. 16 is a top plan view of the arm of FIG. 15.

As shown in FIG. 16, the second portion 42 includes the first and second members 42A and 42B that are spaced apart from one another and rigidly connected together. The first and second members 42A and 42B of the second portion 42 are preferably mirror images of one another, as shown in FIGS. 15 and 16. A web member 42C rigidly connects the first and second members 42A and 42B of the second portion 42.

A bushing 92 extends between the oppositely disposed first fastener openings 78 in the first and second members 40A and 40B of the first portion 40, and a bushing 92 extends between the oppositely disposed second fastener openings 80 in the first and second members 40A and 40B. The at least one cover 86 prevents moisture, dirt and other debris from entering a bushing 92 disposed between the unused openings. As shown in FIG. 9, the cover prevents moisture, dirt and other debris from passing through the first openings 78 to enter the bushing 92 when the fastener 84 is disposed between the second openings 80 in the second orientation. As shown in FIG. 10, the cover prevents moisture, dirt and other debris from passing through the second openings 80 to enter the bushing 92 when the fastener 84 is disposed between the first openings 78 in the first orientation. Dirt and other debris entering the bushing 92 can adversely impact pivotal movement of the fastener when the fastener 84 is received by the bushing 92.

A method in accordance with the exemplary embodiments of the present invention releases the at least one fastener 84 holding the second portion 42 of the work implement 18 in the first orientation (FIG. 3) with respect to the first portion 40 of the work implement 18. The second portion 42 is moved from the first orientation to a second orientation (FIG. 4) that is different from the first orientation (FIG. 3). The at least one fastener 84 is attached to hold the second portion 42 of the work implement 18 in the second orientation (FIG. 4) with respect to the first portion 40.

As shown in FIGS. 1-3, the fastener 84 holds the second portion 42 of the work implement 18 in the first orientation with respect to the first portion 40 of the work implement 18. The second portion 42 is held in the first orientation to reduce the overall length of the work vehicle 10 to facilitate transport by a trailer 44, as shown in FIGS. 1 and 2. As shown in FIG. 3, the fastener 84 is received by the common fastener opening 82 in the second portion 42 and the first fastener opening 78 in the first portion 40. A bushing 92 is disposed between the first and second members 40A and 40B of the first portion 40 to protect the fastener 84. A spacer 94 and a nut 96 can be disposed on a threaded end 84A of the fastener 84 to secure the fastener 84 to the first and second portions 40 and 42. An opposite end of the fastener 84 can have an enlarged head 84B to prevent the fastener from being inserted through the opening in the second first arm portion member 40B. As shown in FIG. 3, the spacer 94 abuts an external surface of the first member 42A of the second portion 42, and the nut 96 is threadedly engaged with a threaded portion 84A of the fastener 84.

As shown in FIGS. 12 to 13, the position of the second portion 42 relative to the first portion 40 in the first orientation can be adjusted with the first stop 46. The first stop 46 is pivotable about the pivot pin 62 such that the first stop 46 can be arranged in one of three positions. The first lock pin 64 is disposed in one of the three mounting holes 60A, 60B and 60C depending on the desired position of the second portion 42. The first stop 46 acts as a locator to properly position the second portion 42 with respect to the first portion 40 in the first orientation to facilitate insertion of the fastener member 84. The cover 86 covers the unused second fastener openings 80 in the first portion 40 when the second portion 42 is in the first orientation with respect to the first portion 40.

The second portion 42 is moved from the first orientation to a second orientation (FIGS. 4 and 5) that is different from the first orientation (FIGS. 2 and 3). As shown in FIGS. 6 to 8, the second portion 42 is in the second orientation with respect to the first portion 40 to perform work, such as harvesting a tree. The work vehicle 10 is transported to a work site with the second portion 42 in the first orientation with respect to the first portion 40, as shown in FIG. 1. Prior to performing the work, the second portion 42 is moved from the first orientation to the second orientation. The fastener 84 is removed from the first fastening hole 78 of the first portion 40 and the common fastener opening 82 of the second portion 42. The cover 86 is removed from the second fastener hole 80 and inserted in the first fastener hole 78. The second portion 42 is then free to pivot about the pivot axis P to the second orientation, as shown in FIGS. 4 and 5. The second portion 42 pivots approximately ninety degrees about the pivot axis P. The second stop 50 stops pivotal movement of the second portion 42 when the second abutment 56 of the second portion 42 contacts the second stop surface 52 of the second stop 50. The second stop 50 further locates the common fastener opening 82 of the second portion 42 with the second fastener hole 80 of the first portion 40 such that the fastener 84 can be easily inserted therethrough to hold the second portion 42 in the second orientation with respect to the first portion 40. The locator function of the second stop 50 allows the second portion 42 to be pivoted from the first orientation to the second orientation by a single operator because the fastener 84 can be easily inserted with one hand while manipulating the second portion 42 with the other hand.

The pivot axis P is preferably a pivot pin 43 received by the first and second portions 40 and 42, as shown in FIG. 3. The first portion 40 has a first pivot hole 45, as shown in FIG. 17, and the second portion 42 has a second pivot hole 47, as shown in FIG. 15. The pivot pin 43 is maintained in the first and second pivot holes 45 and 47 when moving the second portion 42 relative to the first portion 40 between the first and second orientations. A spacer and nut are disposed on a threaded end of the pivot pin 43 to secure the pivot pin 43 the first and second portions 40 and 42. The opposite end of the pivot pin 43 can be similarly configured or can have an enlarged head to prevent the pivot pin 43 from passing through the second members 42B of the second portion 42.

The second stop 46 can be positioned as desired to control the position of the second portion 42 with respect to the first portion 40. The second stop 50 adjusts slack by changing the contact position between the second abutment 56 and the second stop surface 52 of the second stop 50. Rotating the second stop 50 to the desired position accommodates pin tolerancing by changing the distance between the mounting holes 70 and the second stop surface 52. In the illustrated embodiment, the contact is changed between approximately 0 to 3.0 mm, although the second stop 50 can be configured to control the change in contact.

As shown in FIGS. 6-8, the boom 24 and the arm 26 are illustrated in various orientations while harvesting a tree 98. The first and second portions 40 and 42 being in a collinear configuration allows proper arm cutting positions to be obtained relative to the tree 98. The arm tip of the second portion 42 of the arm 26 does not contact the tree 98, thereby facilitating harvesting of the tree 98.

The second portion 42 can be moved back to the first orientation by removing the fastener 84 from the second fastening hole 80 of the first portion 40 and the common fastener opening 82 of the second portion 42. The cover 86 is removed from the first fastener hole 78 and inserted in the second fastener hole 80. The second portion 42 is then free to pivot about the pivot axis P to the second orientation, as shown in FIGS. 2 and 3. The second portion 42 pivots approximately ninety degrees about the pivot axis P. The first stop 46 stops pivotal movement of the second portion 42 when the first abutment 54 of the second portion 42 contacts the first stop surface 48 of the first stop 46. The first stop 46 further locates the common fastener opening 82 of the second portion 42 with the first fastener hole 78 of the first portion 40 such that the fastener 84 can be easily inserted therethrough to hold the second portion 42 in the first orientation with respect to the first portion 40. The locator function of the first stop 50 allows the second portion 42 to be pivoted from the first orientation to the second orientation by a single operator because the fastener 84 can be easily inserted with one hand while manipulating the second portion 42 with the other hand.

As shown in FIGS. 2-5, the second portion is movably coupled to the first portion to move between first and second orientations. Although only the first and second orientations are shown, the first portion can include additional fastener openings such that the second portion can be secured in a plurality of orientations with respect to the first portion. Alternatively, an arcuate slot can be disposed in the first portion through which the second portion can be slidably moved, thereby providing a plurality of orientations in which the second portion can be secured with respect to the first portion.

The present invention is equally applicable to an exemplary embodiment in which the first portion is an arm of the work vehicle and the second portion is an arm tip of the work vehicle. The arm tip is movably coupled to the arm between a first orientation and a second orientation with respect to the arm.

Many parts of the work vehicle are conventional components that are well known in the work vehicle field. Since these components are well known in the work vehicle field, these structures will not be discussed or illustrated in detail herein, except as related to the invention set forth in the following claims.

As used herein, the following directional terms "forward, rearward, above, downward, vertical, horizontal, below and transverse" as well as any other similar directional terms refer to those directions of a work vehicle on a level surface. Accordingly, these terms, as utilized to describe the present invention should be interpreted relative to a work vehicle equipped with the present invention. The terms of degree such as "substantially", "about" and "approximately" as used herein mean a amount of deviation of the modified term such that the end result is not significantly changed.

While only selected embodiments have been chosen to illustrate the present invention, it will be apparent to those skilled in the work vehicle field from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A work implement comprising:
   a boom including a chassis attachment end and an arm attachment end;
   an arm including a boom attachment end and a tool attachment end, the boom attachment end being pivotally coupled to the arm attachment end of the boom; and
   a work tool coupled to the tool attachment end of the arm,
   the arm including a first portion and a second portion movably coupled to the first portion between a first orientation with respect to the first portion and a second orientation with respect to the first portion, the first portion is a first arm portion having the boom attachment end and the second portion is a second arm portion having the tool attachment end, and
   at least one fastener being coupled between the first and second portions to selectively secure the second portion in the first orientation and the second orientation with respect to the first portion.

2. The work implement according to claim 1, wherein
   one of the first and second orientations is a retracted orientation, and
   another of the first and second orientations is an extended orientation.

3. The work implement according to claim 1, wherein
   the second portion is pivotally attached to the first portion such that the second portion pivots relative to the first portion about a pivot point between the first and second orientations.

4. The work implement according to 1, wherein
   one of the first and second portions includes a first stop having a first stop surface, and another of the first and second portions includes a first abutment arranged to contact the first stop surface in the first orientation, and
   one of the first and second portions includes a second stop having a second stop surface, and another of the first and second portions includes a second abutment arranged to contact the second stop surface in the second orientation.

5. The work implement according to claim 4, wherein
   the first stop surface is adjustably arranged relative to the first abutment in the first orientation, and
   the second stop surface is adjustably arranged relative to the second abutment in the second orientation.

6. The work implement according to claim 5, wherein
   the first stop includes a first cam having the first stop surface, the first stop surface being movably arranged between at least two different positions, and
   the second stop includes a second cam having the second stop surface, the second stop surface being movably arranged between at least two different positions.

7. The work implement according to claim 6, wherein
   the first cam is pivotally mounted on a first pivot pin, the first cam is non-rotatably mountable in the different positions using a first lock pin, and the first stop surface is spaced different distances from the first pivot pin in each of the different positions, and
   the second cam is pivotally mounted on a second pivot pin, the second cam is non-rotatably mountable in the different positions using a second lock pin, and the second stop surface is spaced different distances from the second pivot pin in each of the different positions.

8. The work implement according to claim 7, wherein
   one of the first cam and the one of the first and second portions that includes the first stop has a number of first mounting holes corresponding to the number of positions of the first stop surface, and
   one of the second cam and the one of the first and second portions that includes the second stop has a number of second mounting holes corresponding to the number of positions of the second stop surface.

9. The work implement according to claim 1, wherein
   one of the first and second portions includes first and second fastener openings, another of the first and second portions includes a common fastener opening,
the fastener is received in the first fastener opening and the common fastener opening when the second portion is in the first orientation with respect to the first portion, and
the fastener is received in the second fastener opening and the common fastener opening when the second portion is in the second orientation with respect to the first portion.

10. The work implement according to claim 9, wherein first portion includes the first and second fastener openings, and the second portion includes the common fastener opening.

11. The work implement according to claim 9, wherein at least one cover is arranged to cover
    the first fastener opening when the second portion is in the second orientation with respect to the first portion, and
    the second fastener opening when the second portion is in the first orientation with respect to the first portion.

12. The work implement according to claim 1, wherein the first arm portion has a first length and the second arm portion has a second length shorter than the first length.

13. The work implement according to claim 12, wherein the first length is at least three times the second length.

14. The work implement according to claim 1, wherein the second portion is substantially collinear with the first portion in one of the first and second orientations, and
the second portion is angled about 90 degrees relative to the first portion in another of the first and second orientations.

15. The work implement according to claim 1, wherein the boom has a length of at least four meters, and the arm has a length of at least four meters.

16. The work implement according to claim 1, wherein the work tool includes a harvester head.

17. A work vehicle including the work implement according to claim 1, the work vehicle further comprising:
    a ground propulsion apparatus;
    a chassis supported by the ground propulsion apparatus; and
    a vehicle body supported by the chassis,
    the chassis attachment end of the boom being attached to at least one of the chassis and vehicle body.

18. A method of moving a portion of a work implement of a work vehicle, the work implement including a boom, an arm and a work tool, the method comprising:
    releasing at least one fastener holding a second portion of the arm in a first orientation with respect to a first portion of the arm, the first portion being a first arm portion having a boom attachment end and the second portion being a second arm portion having a tool attachment end;
    moving the second portion from the first orientation to a second orientation different from the first orientation;
    attaching the fastener to hold the second portion of the arm in the second orientation with respect to the first portion.

19. The method according to claim 18, wherein the first arm portion has a first length and the second arm portion has a second length shorter than the first length.

20. The method according to claim 19, wherein the first length is at least three times the second length.

21. A work implement comprising:
    a boom including a chassis attachment end and an arm attachment end;
    an arm including a boom attachment end and a tool attachment end, the boom attachment end being pivotally coupled to the arm attachment end of the boom; and
    a work tool coupled to the tool attachment end of the arm,
    at least one of the boom and the arm including a first portion and a second portion movably coupled to the first portion between a first orientation with respect to the first portion and a second orientation with respect to the first portion, and
    at least one fastener being coupled between the first and second portions to selectively secure the second portion in the first orientation and the second orientation with respect to the first portion,
    one of the first and second portions including a first stop having a first stop surface, and another of the first and second portions including a first abutment arranged to contact the first stop surface in the first orientation, and
    one of the first and second portions including a second stop having a second stop surface, and another of the first and second portions including a second abutment arranged to contact the second stop surface in the second orientation.

22. The work implement according to claim 21, wherein the first stop surface is adjustably arranged relative to the first abutment in the first orientation, and
the second stop surface is adjustably arranged relative to the second abutment in the second orientation.

23. The work implement according to claim 22, wherein the first stop includes a first cam having the first stop surface, the first stop surface being movably arranged between at least two different positions, and
the second stop includes a second cam having the second stop surface, the second stop surface being movably arranged between at least two different positions.

24. The work implement according to claim 23, wherein the first cam is pivotally mounted on a first pivot pin, the first cam is non-rotatably mountable in the different positions using a first lock pin, and the first stop surface is spaced different distances from the first pivot pin in each of the different positions, and
the second cam is pivotally mounted on a second pivot pin, the second cam is non-rotatably mountable in the different positions using a second lock pin, and the second stop surface is spaced different distances from the second pivot pin in each of the different positions.

25. The work implement according to claim 24, wherein one of the first cam and the one of the first and second portions that includes the first stop has a number of first mounting holes corresponding to the number of positions of the first stop surface, and
one of the second cam and the one of the first and second portions that includes the second stop has a number of second mounting holes corresponding to the number of positions of the second stop surface.

\* \* \* \* \*